United States Patent [19]
Benjamin

[11] 3,938,779
[45] Feb. 17, 1976

[54] PLASTIC VALVE
[75] Inventor: Braham G. Benjamin, Tustin, Calif.
[73] Assignee: Flo-Tite Plastics Corporation, Temple, Tex.
[22] Filed: Aug. 1, 1974
[21] Appl. No.: 493,530

[52] U.S. Cl. .................. 251/268; 251/327; 251/328
[51] Int. Cl.² ........................................... F16K 3/12
[58] Field of Search ........... 251/195, 326, 327, 328, 251/329, 268, 266, 267

[56] References Cited
UNITED STATES PATENTS

| | | | |
|---|---|---|---|
| 3,006,597 | 10/1961 | Hookway | 251/327 X |
| 3,420,499 | 1/1969 | Pletcher | 251/327 X |
| 3,829,061 | 8/1974 | Dayne | 251/328 |

Primary Examiner—Alan Cohan
Attorney, Agent, or Firm—Georges A. Maxwell

[57] ABSTRACT

A gate valve having a non-yielding body with a gate accommodating chamber with flat, downwardly converging end seating surfaces about portions of a flow passage communication with the chamber and downwardly convergent side seating surfaces, a wedge-shaped relatively soft resilient gate with downwardly convergent end sealing surfaces to establish tight sealing and wedging engagement with the end seating surfaces and downwardly convergent side surfaces to establish wedging engagement with the side seating surfaces, the angle of said end surfaces being less accute than the angle of said side surfaces whereby forces directed laterally inwardly and resolved axially in the gate by the side walls is greater than axial forces generated by the end surfaces when the gate is urged down in the body and whereby the end surfaces are urged and held in conforming seated and sealed engagement by the laterally directed and axially resolved forces, and operating means carried by the body and engaging the gate to selectively move the gate vertically upwardly and downwardly in the body chamber and into and out of intersecting relationship with the flow passage and said surfaces in the body.

4 Claims, 8 Drawing Figures

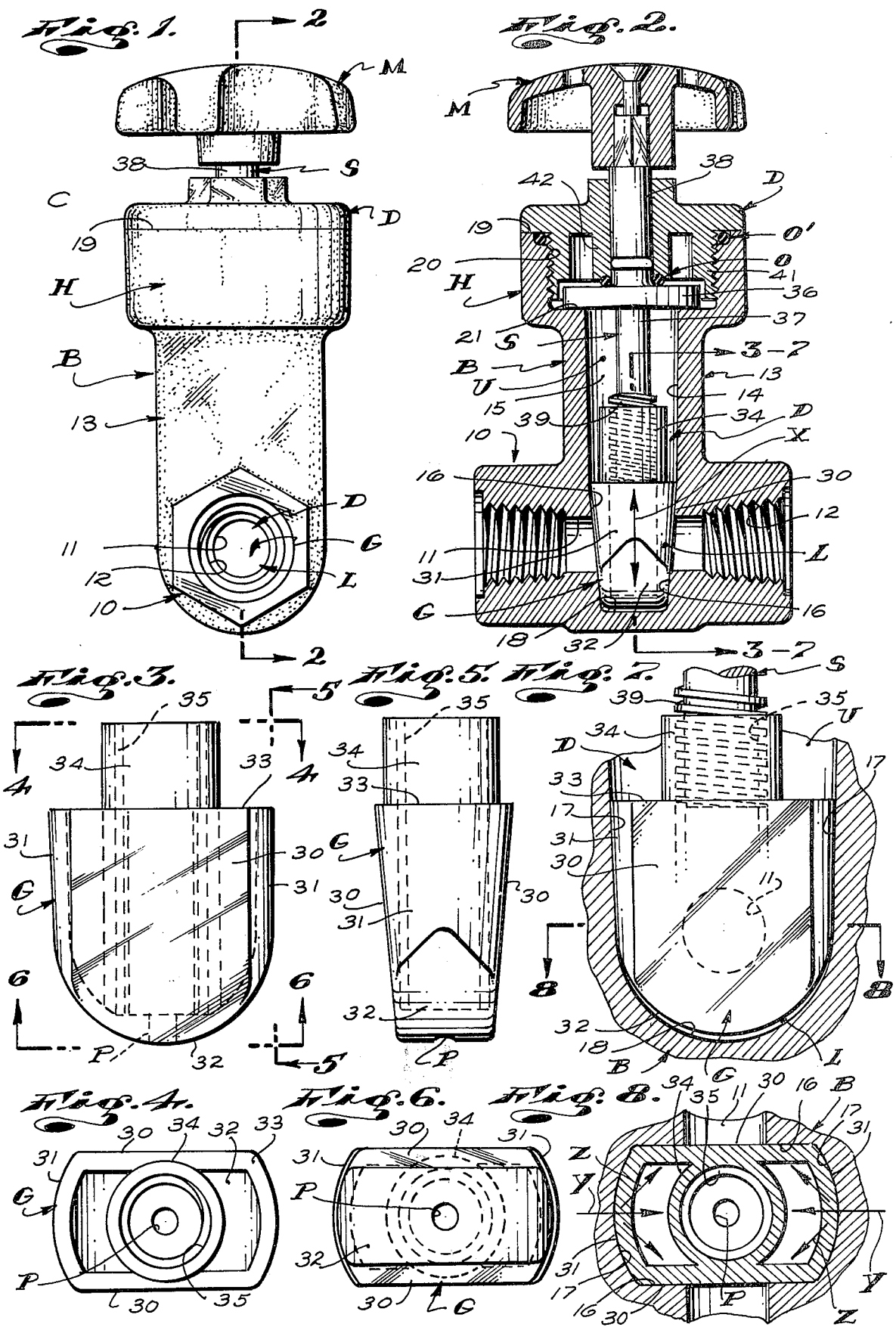

PLASTIC VALVE

This invention relates to a fluid handling gate valve and is more particularly concerned with an improved gate valve construction established of molded plastic parts.

The ordinary gate valve construction comprises a valve body with a flow passage extending therethrough, a normally closed chamber in the body, intersecting flow passage and having flat, axially spaced downwardly convergent seating surfaces, a wedge shaped valve member or gate with spaced downwardly convergent end sealing faces to oppose said seating surfaces, annular sealing means in the said surfaces about the flow passage to engage and seal with the gate, or, sealing means carried by the gate to seal with said seating surfaces about the flow passage and means operable to shift the gate into and out off intersecting engagement with the passage and to make and break the seal established by the sealing means provided.

It is to be noted that the taper or wedge shape imparted in the bodies and gates of such valves is normally intended to permit the necessary movement of the gate in the body and the effective movement of the parts and/or portions of the sealing means into and out of cooperative relationship with each other without adverse effects and to effect the application of desired and necessary operating forces and pressure on and to the sealing means.

It has long been desired and sought to easly and economically establish a gate valve structure for general use wherein the gate establishes an effective and dependable seal with the seating surfaces in the chamber of the valve body, without the need of the separate, special sealing means normally required. With such a structure, the substantial costs of the sealing means and the service problems associated therewith can be eliminated and a less costly and relatively service free valve can be provided.

In the prior art some gate valves have been provided wherein the gate per se seals in and with the body and the provision of separate sealing means is eliminated. In such cases, the elimination of the sealing means and the establishment of the necessary sealing relationship between the gates and the bodies have been made possible by the special and costly machining and dressing of the opposing and mating surfaces of the gates and bodies. In such instances, the cost of machining and dressing the surfaces of the valve structures is, as a general rule, far more costly than the provision of separate sealing means. Accordingly, such practices are ordinarily resorted to only in those cases where, for some reason, the provision or inclusion of a separate sealing means must be avoided.

Another form of gate valve structure provided by the prior art which does not require and include separate sealing means between the gate and the body consist of a valve structure wherein the valve member or gate is eatablished of soft, resilient, rubber or a rubber substitute. In such valves, the rubber wedges or gates are simply yieldingly urged into sealing engagement with the opposing seating and sealing surfaces in the valve bodies, where they intersect the flow passage. While such valves might be effective in situations where little or no appreciable fluid pressures are encountered, they are not suitable for general use where the fluids handled are under pressure and act upon the gates to move or displace the soft materials and destroy the seals established thereby.

In the case of gate valves wherein the body and the gate are molded of plastic materials, continuing efforts have been made to establish the parts so that the mating surfaces of the body and gate are sufficiently flat and smooth to establish a seal, without requiring machining and/or dressing those surfaces and with the result that a dependable and serviceable valve, without separate and costly sealing means can be economically produced and marketed. Unfortunately, due to the inherent tendency of all known plastics, suitable for use in establishing valves, to shrink and warp in the course of their being molded and formed, the above noted and sought for end has been and presently appears to be unattainable, within the limits of practability.

While present day plastic molding practices and means are such that nearly flat and smooth mating surfaces in molded plastic valve structures can be produced, the slight and oftentimes minor imperfections and irregularities which occur in those surfaces make it impossible to practically and economically produce such valves without incorporating some separate and special sealing means in them.

An object and feature of my invention is to provide a gate valve structure with an improved soft, deformable, resilient, molded plastic gate adapted to be urged into conforming fluid sealing engagement with related sealing surfaces in the valve body and which resists and is not subject to being displaced by fluids under pressures acting upon it.

It is an object and feature of the instant invention to provide a wedge shaped valve gate of the character referred to having axially spaced downwardly convergent and oppositely disposed end sealing walls or faces to establish tight wedging, conforming and sealing engagement with related end seating surfaces in the valve body and a gate having laterally spaced, outwardly disposed and downwardly convergent side walls or surfaces to establish tight wedging engagement with related side surfaces in the body whereby the gate is held captive and contained between both its ends and sides.

Yet another object and feature of this invention is to provide a valve structure of the character referred to wherein the angle of inclination of the related end surfaces is different from the angle of inclination of the related side surfaces whereby the machanical advantage afforded by the side surfaces and the forces directed laterally inwardly in the gate are greater than the mechanical advantage afforded by the end surfaces and the forces directed axially in the gate when the gate is wedged tight in the body, whereby the forces exerted by the gate on the end surfaces of the body are greater than the axial forces established by and between the end surfaces and whereby the end surfaces of the gate are urged into conforming, sealing engagement with their related mating end surfaces of the body and held against displacement by fluid under pressure acting thereon by said greater laterally inwardly directed forces.

Still another object and feature of my invention is to provide a valve structure of the character referred to above wherein the said related side surfaces of the gate and body and gate are formed and disposed whereby the laterally directed forces are resolved and directed laterally inwardly and axially outwardly from the sides of the gate to the portions of the end surfaces of the gate related thereto and so that said lateral forces are most efficiently utilized to urge and hold the related end surfaces of the construction engaged.

The foregoing and other object and features of my invention will be apparent and understood from the following description of a typical preferred form and application of the invention throughout which description reference is made to the accompanying drawings in which:

FIG. 1 is an end elevational view of a gate valve embodying the present invention;

FIG. 2 is a sectional view taken as indicated by line 2—2 on FIG. 1;

FIG. 3 is a view of the valve gate taken substantially as indicated by line 3—3 on FIG. 2;

FIG. 4 is a view taken as indicated by line 4—4 on FIG. 3;

FIG. 5 is a view taken as indicated by line 5—5 on FIG. 3;

FIG. 6 is a view taken as indicated by line 6—6 on FIG. 3;

FIG. 7 is a view taken substantially as indicated by line 7—7 on FIG. 2; and

FIG. 8 is a view taken as indicated by line 8—8 on FIG. 7.

In the drawings I have elected to illustrate one typical and preferred form of gate valve structure in which the present invention can be advantageously employed and/or put to practice.

The valve structure is shown as including generally, a body B, a bonnet C, a valve member or gate G within the body, a stem S cooperatively related to and with the body, bonnet and gate, a manually engageable operating handle M carried by the stem, sealing means O between the stem and the bonnet and sealing means O' between the body and the bonnet.

The body B, gate G, stem S and bonnet C are each unitary molded plastic parts.

The body B is characterized by an elongate, horizontal lower portion 10 with a central, axially extending flow passage 11. The opposite, longitudinally outwardly opening end portions of the passage 11 are adapted to communicate with related fluid conducting means and are shown provided with internal pipe threads 12 to facilitate connecting the body with related pipe sections.

The exterior of the above noted end portions of the body are preferably polygonal to facilitate engaging the body with suitable hand tools when connecting said body with related fluid conducting means, such as pipe sections.

The body B next includes an elongate, vertical, central case portion 13, the lower portion of which intersects the lower portion 10, between the ends thereof and the upper portion which projects freely upwardly from said lower portion.

The portion 13 defines an elongate vertical chamber D having a lower portion L with which opposite end portions of the flow passage 11 communicate and an upper portion U that opens at the top of the body. The upper portion U of the chamber D is preferably rectangular in cross-section and is characterized by flat, vertical end walls with axially spaced opposing surfaces 14 and vertical side walls with laterally spaced opposing surfaces 15.

The lower portion L of the chamber D is defined by extensions of the end and side walls and by the lower portion of the body and has flat, axially spaced downwardly convergent, inclined seating surfaces 16, laterally spaced, opposing, downwardly convergent, concaved or radiused side surfaces 17, and an axially straight, upwardly and inwardly disposed semi-circular bottom surface 18.

The details of the lower portion L of the chamber D and its relationship with the gate G will be considered in greater detail in the following:

The flow passage 11 intersects to central portion of said lower portion of the chamber to be bisected thereby and so that the inner ends of the opposite end portions of the passage open, centrally, at the seating surfaces 16.

The body B is next provided with an enlarged cylindrical head portion H. At the upper end of the case portion, the portion H has a flat top 19 and an upwardly opening, large diameter, internally threaded socket 20 with a flat upwardly disposed bottom 21 at which the chamber D opens.

The gate G is an elongate vertical wedge-like part, corresponding generally in outside configuration with the lower portion U of the chamber D and is characterized by flat, axially spaced, oppositely disposed, downwardly convergent end sealing walls 30, laterally spaced, oppositely disposed, downwardly convergent, convexly curved side walls 31 and a downwardly and radially outwardly disposed, substantially axially straight, semi-circular bottom wall 32. The gate has a flat top 33 and a central core 34 with an upwardly opening, vertical, threaded bore 35.

The details of the gate and its relationship with the chamber D and stem S will be considered further in the following.

The stem S is an elongate vertical part with a central, flat, disc-shaped thrust flange 36, a lower shank portion 37 and an upper shaft portion 38. The flange 36 is slidably engaged on and supported by the bottom 21 of the socket 20. The shank portion 37 is threaded at its lower end portions, as at 39 and is threadedly engaged in the bore in the gate.

The lower end of the shank portion terminates on a plane above the uppermost or top portion of the flow passage 11, at the lower end of the upper portion U of the chamber D.

The shaft portion 38 of the stem projects freely upwardly from the flange 36 and from within the confines of the socket C.

The bonnet B is a unitary part with a central stop flange 40 engaging the top of the head H of the body, a lower externally threaded skirt 41 engaged in the socket 20 and a central tube portion 42 in and through which the shaft portion of the stem is rotatably engaged and which depends from the stop flange into close, opposing relationship with the top of the thrust flange of the stem. The lower end of the tube portion is provided with a radially and axially downwardly opening radiused groove. The junction between the thrust flange and shank portion of the stem is radiused to establish a radially outwardly and upwardly disposed annular seat spaced from and opposing the radiused groove and an O-ring seal is engaged with and between the radiused groove and seat. The said radiused groove, seat and O-ring establish the sealing means O between the stem and bonnet. The sealing means O' between the bonnet and the body, includes an annular radially inwardly and axially upwardly opening sealing ring groove at the upper end of the stocket 20 in the head H and an O-ring seal in that groove and engaging the bottom of the stop flange and the skirt of the bonnet.

The handle M is a simple manually engageable substantially disc-shaped part above the bonnet B in driving engagement with the upper end of the shaft portion of the stem and is releasably secured to the stem by a suitable screw fastener.

In operation, upon rotation of the handle M and stem S in one direction, the gate is advanced upwardly relative to the stem S and from engagement in the lower portion L of the chamber C into the upper portion U thereof, to open the valve. Upon rotation of the handle and stem in the other direction, the gate is advanced down from within the upper portion U of the chamber into the lower portion L thereof to close the valve.

But for the configuration of the gate G and the chamber D and the cooperative relationship of those parts and portions of the construction, the details of construction can be varied widely, as desired and/or as circumstances require.

Novelty of the of the instant invention resides in configuration and cooperative relationship of the valve gate and valve chamber.

As noted above, the lower portion L of the chamber D has flat, axially spaced, downwardly convergent, opposing end seating surfaces 16, laterally spaced, opposing, concaved or radiused downwardly convergent side surfaces 17 and an axially straight, radially upwardly and inwardly disposed semi-circular bottom surface 18. The gate G, as noted above, corresponds in general exterior configuration with the inside configuration of the lower portion L of the chamber D and has flat, axially spaced, oppositely disposed, downwardly convergent end sealing walls 30, laterally spaced, laterally outwardly disposed, convex, downwardly convergent side walls 31, an axially straight semi-circular bottom wall 32 and a flat top 33. In addition, the gate has the previously noted central core 34 with its upwardly opening threaded bore 35 and in which the lower threaded end portion of the stem S is engaged.

It is important to note at this time that while it is desired and effort is made to establish the end sealing surfaces 17 in the chamber D of the body and the exterior surfaces of the end sealing walls 30 of the gate truly flat and smooth so that they might match and mate to establish a fluid seal when moved into engagement with each other, such desired results are not practically attainable due to the nat re and tendency of the plastic materials of which these parts are made to warp and/or shrink in the course of their manufacture. As a result, the noted opposing sealing surfaces of the construction are seldom, if ever, sufficiently flat and smooth to establish an effective seal by themselves and are such that other and supplemental means and/or forces must be utilized to compensate for those undesirable irregularities which are commonly found to be present.

Considering the gate or valve member G and its relationship with the chamber D in greater detail, it is to be noted first that the gate G is established or molded of a flexible, resilient plastic material with good memory characteristics, such as "Hytrel No. 6355", a product of DuPont, and is softer than the body B which is made or molded of a relatively hard or substantially nonyielding plastic material such as Polypropylene.

In practice, the gate can have a shore hardness of about 55D and the body can have a Rockwell hardness of about M-57-R111.

In accordance with the above, the body is a substantially non-yielding structure and the gate is a soft, and resilient structure with respect to the body and has good memory.

The gate G, made up of the several noted walls 30, 31 and 32, is an upwardly opening shell-like structure.

The core 34 is an elongate vertical portion of the gate arranged centrally thereof and extends vertically from the bottom wall 32 to a point spaced above the top 33 of the gate per se and is integrally joined with and extends between the end sealing walls 30, along the central vertical axes thereof to provide central support therefore.

The bottom wall 32 is provided with a port P which communicates with and vents the lower end of the threaded bore 35 in the core.

The end seating surfaces 16 in the body or chamber and the end sealing walls 30 of the gate G are inclined at about 5° relative to the central vertical axes of the gate and chamber and the downwardly convergent side surfaces and walls 17 and 31 of the chamber and gate are inclined at less than one-half the angle of the surfaces and walls 16 and 30, for example, at about 1.5° or 2° relative to said central vertical axis. Accordingly, the angles of the side surfaces and walls are materially less than the angles of the end surfaces and walls and the mechanical advantage afforded by the inclined plane of the related side surfaces and walls is materially greater than that afforded by the related end surfaces and walls when the gate is urged downwardly in the direction indicated by the arrow X in FIG. 2 of the drawings and into tight wedging engagement in the chamber.

As a result of the above, the opposing laterally inwardly directed forces exerted onto and through the gate and indicated by the arrows Y in FIG. 8 of the drawings is greater than the opposing end forces exerted onto and through the gate at the end sealing walls 30 thereof. The noted greater lateral forces indicated by the arrows Y are resolved in and through the gate in the directions indicated by the arrows Z in FIG. 8 of the drawings and serves to urge the end walls 30 axially outwardly toward and into conforming tight sealing engagement with their opposing seating surfaces 16 and about the portions of the flow passage 11 opening centrally of said seating surfaces.

It is to be further noted that the side walls 31 of the gate, being outwardly convex and inwardly concaved have and/or are characterized by laterally inwardly and longitudinally outwardly inclined vertical edges which join the vertical side edges of the end walls 30 and are such that the forces transmitted through the side walls toward the end walls are transmitted laterally inwardly and longitudinally outwardly to the vertical edges of the end walls and are resolved thereon to urge the end walls axially outwardly toward and into tight engagement with their opposing seating surfaces 16 and about the portions of the flow passage 11 opening centrally of said seating surfaces.

In practice, the gate G is established sufficiently large in exterior dimensions and/or configuration so that upon downward movement of the gate in the chamber, the side and end walls thereof first establish sliding running fit with their related surfaces in the chamber and upon further, limited downward movement of the gate in the chamber, establish tight, wedging and interfering fit therewith. When the noted interfering fit is established, the material of the gate is confined about and between the side and end surfaces of the chamber and the major forces exerted into and through the gate, indicated by the arrows Y and Z, tend to urge and displace the soft and resilient end sealing walls into sealing engagement with the end seating surfaces. The laterally applied and resolved forces Y and Z act most effectively on the opposite vertical side portions of the end sealing walls 30 of the gate and are less effective on the vertical central portions thereof. The vertical central portions of the walls 30 are, however, supported and backed by the core 34 and are positively urged and held engaged with the surfaces 16 and across the portions of the flow passage 11 opening at said surfaces thereby.

In practice, the bottom surface 18 of the chamber D and bottom wall 32 of the gate G are complimentary and are such that when the gate is advanced downwardly in the chamber to its maximum anticipated extent and the gate is wedged as tight in the chamber as structural limits of the valve will afford, the wall 32 seats with the surface 18. In practice, it is preferred that the gate, under normal circumstances, establishes closed engagement in and with the chamber before the gate actually seats of the bottom of the chamber, whereby suitable allowance is made for slight deviations in the proportioning of parts, wear and the like.

From the foregoing, it will be apparent that the gate G that I provide is sufficiently soft and resilient so that when it is urged down and into tight wedging engagement in the chamber, the end sealing walls 30 can and will flex and conform to and establish sealing engagement with the opposing and seating surfaces 16 in the chamber. In addition to the foregoing, it will be noted and it will be apparent that the fluid pressures acting upon the soft and flexible gate, centrally of the end sealing walls (at and about the inner open ends of the section 7 of the flow passage) and which tend to urge those walls from sealing engagement with their related opposing seating surfaces are countered by the greater forces generated by and between the related side walls 31 and surfaces 17 of the construction which are directed laterally inwardly into the gate and thence axially and inwardly into and through the end sealing walls 30, to maintain those walls sealed with their opposing surfaces 16. By virtue of the forces generated and directed by the related side walls and surfaces 31 and 17, a gate of soft, resilient material capable of conforming to and establishing sealing engagement with related sealing surfaces and which is effectively supported and acted upon to resist fluid pressure which would otherwise destroy the seal established, is provided.

Having illustrated and described only one preferred form and carrying out of my invention, I do not wish to be limited to the specific details herein set forth, but wish to reserve to myself any modifications and/or variations that might appear to those skilled in the art and which fall within the scope of the following claims:

Having described my invention, I claim:

1. A gate valve comprising a body with an elongate horizontal axially extending lower portion and an elongate central portion between the ends of and extending upwardly from the lower portion and defining a normally closed chamber with an upper portion and a lower portion with flat axially spaced, substantially axially inwardly disposed, axially inwardly and downwardly inclined end seat surfaces, laterally spaced substantially laterally inwardly disposed, laterally inwardly and downwardly inclined side support surfaces and a substantially upwardly disposed bottom surface, an axially extending flow passage in the lower portion of the body intersecting the lower portion of the chamber and communicating therewith substantially centrally of said seat surfaces, a vertically extending vertically shiftable gate of flexible resilient material in the chamber and having a top, axially spaced substantially axially outwardly disposed and axially inwardly and downwardly inclined end sealing surfaces, laterally spaced substantially laterally outwardly disposed and downwardly and laterally inwardly inclined side supported surfaces and a substantially downwardly disposed bottom surface, said gate normally arranged in the lower portion of the chamber with its supported and sealing surfaces in tight wedging engagement with opposing related seat and support surfaces of the chamber and with the bottom surface of the gate in spaced opposing relationship with the bottom surface of the chamber and operating means to selectively shift the gate vertically to and from said normal position and in the upper portion of the chamber, the angle of inclination of said supported and support surfaces is less from the central vertical axis of the gate and chamber than is the angle of the sealing and seat surfaces from said vertical axis.

2. A structure as set forth in claim 1 wherein the supported and support surfaces have upwardly, axially and laterally outwardly extending edge portions joining adjacent edge portions of their related sealing and seat surfaces.

3. A structure as set forth in claim 1 wherein said operating means includes an upwardly opening internally threaded vertical bore in the gate, an elongate vertical rotatable stem with a lower externally threaded end engaged in said bore and projecting upwardly through and from the body, a manually engageable handle on the stem at the exterior of the body, sealing means between the stem and the body and thrust bearing means between the body and stem.

4. A gate valve comprising a body with an elongate horizontal axially extending lower portion and an elongate central portion between the ends of and extending upwardly from the lower portion and defining a normally closed chamber with an upper portion and a lower portion with flat axially spaced, substantially axially inwardly disposed, axially inwardly and downwardly inclined end seat surfaces, laterally spaced substantially laterally inwardly disposed, laterally inwardly and downwardly inclined side support surfaces and a substantially upwardly disposed bottom surface, an axially extending flow passage in the lower portion of the body intersecting the lower portion of the chamber and communicating therewith substantially centrally of said seat surfaces, a vertically extending vertically shiftable gate of flexible resilient material in the chamber and having a top, axially spaced substantially axially outwardly disposed and axially inwardly and downwardly inclined end sealing surfaces, laterally spaced substantially laterally outwardly disposed and downwardly and laterally inwardly inclined side supported surfaces and a substantially downwardly disposed bottom surface, said gate normally arranged in the lower portion of the chamber with its supported and sealing surfaces in tight wedging engagement with opposing related seat and support surfaces of the chamber and with the bottom surface of the gate in spaced opposing relationship with the bottom surface of the chamber and operating means to selectively shift the gate vertically to and from said normal position and in the upper portion of the chamber, the angle of inclination of said supported and support surfaces is less from the central vertical axis of the gate and chamber than is the angle of the sealing and seat surfaces from said vertical axis, said supported and support surfaces have upwardly axially and laterally outwardly extending edge portions joining adjacent edge portions of their related sealing and seat surfaces.

* * * * *